Jan. 17, 1967  S. HANSEN  3,298,718
SEALING DEVICE
Filed Sept. 20, 1965
Fig. 1.
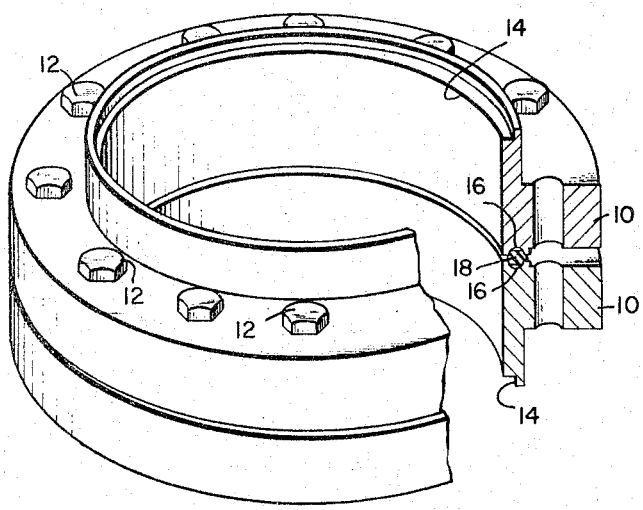
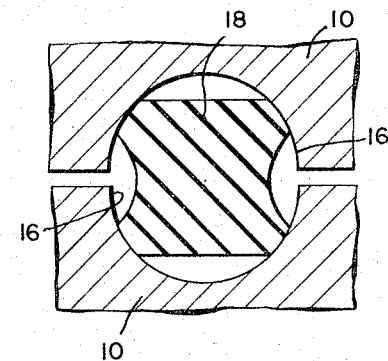
Fig. 4.
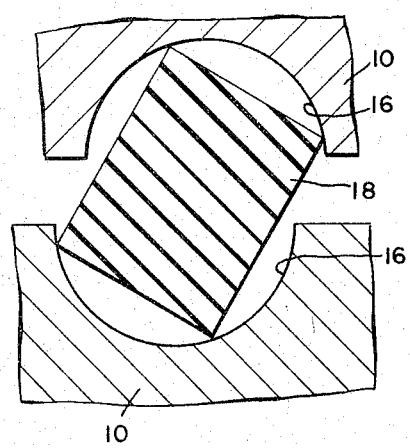
Fig. 3.
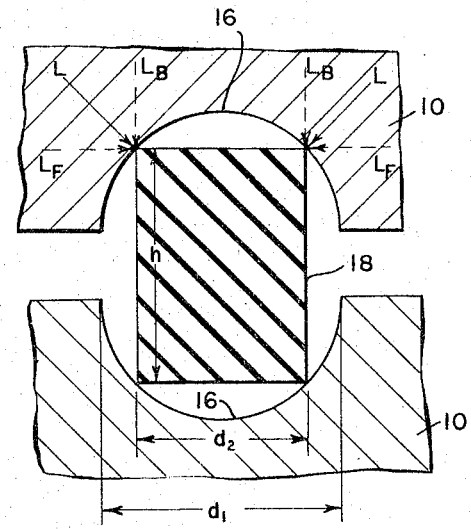
Fig. 2.
Siegfried Hanson,
INVENTOR.
BY
Walter R. Thiel
ATTORNEY.

3,298,718
SEALING DEVICE
Siegfried Hansen, Los Angeles, Calif., assignor to Hughes Aircraft Company, Culver City, Calif., a corporation of Delaware
Filed Sept. 20, 1965, Ser. No. 488,338
2 Claims. (Cl. 285—336)

This invention relates to a gasket flange seal and more particularly to a gasket seal for demountable flange joints which may be subjected to extreme conditions of temperature and/or pressure.

As technological advances are made in the areas of cryogenic and high vacuum or high pressure systems, an increased need arises for an efficient sealing device to provide effective and contamination-free sealing at the coupling joints of various components of the systems. Numerous seals have been developed to fulfill such requirements. One such seal compresses a rectangular soft metal sealing gasket between the inclined surfaces of opposed grooves in adjacent sealing flanges. This seal has proven effective for general high vacuum systems where bakeout of the seal is a problem, but is difficult to use because of the critical requirement that the grooves in the flange halves be precisely dimensioned and accurately aligned.

Therefore, it is an object of the present invention to provide an improved sealing device for systems subjected to extreme conditions of temperature and/or pressure.

It is another object of the present invention to provide an improved sealing device which provides an effective seal by substantially reducing the imperfections in the sealing surfaces.

A still further object of the present invention is to provide a sealing device for systems encountering conditions of extreme temperature and/or pressure which does not require extremely close tolerances in the sealing parts.

Another object of the present invention is to provide an improved sealing device wherein a metal gasket having a plurality of sealing edges is held in substantially semicircular grooves in opposing sealing flanges.

Briefly, the present invention relates to an improved sealing device comprising a substantially rectangular soft metallic gasket and a pair of sealing elements each including a flange portion and having opposing semicircular grooves. The sealing gasket has a major dimension substantially the same as the diameter of the semicircular portions and a minor dimension less than the major dimension such as .707 of the major diameter. This specific dimensioning enables an efficient seal to be maintained between the sealing surfaces when they are rigidly united by a plurality of bolts by uninterrupted contact of the four edges of the sealing gasket by the grooves although the sealing elements are slightly misaligned.

FIGURE 1 is a perspective view of a typical pair of sealing elements incorporating the sealing device of the present invention and cut away to show the sealing gasket in cross section captured by the sealing grooves in the flange members;

FIG. 2 is an enlarged view of a portion of the pair of sealing elements of FIG. 1 showing in greater detail the sealing gasket in contact with the semicircular grooves in the flange members;

FIG. 3 is an enlarged view similar to FIG. 2 except showing one of the sealing elements slightly shifted relative to the other sealing element illustrating the continued contact of the sealing gasket with the semicircular sealing grooves although the grooves are misaligned; and FIG. 4 is an enlarged view similar to FIG. 2 except showing the sealing gasket deformed under the compressive sealing force.

Referring now to FIG. 1, the sealing device of the present invention is typically utilized to seal opposing surfaces of sealing elements or coupling sections such as the flanges of sections of ducting or piping of high vacuum or low temperature systems. Typically, in such systems each coupling section includes a pair of flanges 10 which are united by conventional fastening devices such as a plurality of bolts 12 and have the ducting or piping (not shown) affixed, such as by welding, to annular retaining recesses 14 in the leg portions 11 of the coupling sections. Slightly inward from the inner surface of the coupling section and in the opposing surfaces of the flanges 10 is a substantially half circle or semicircular sealing groove 16. The sealing grooves 16 are in general alignment and are located a minimum distance from the bolt circles. This distance is a function of the material of the flange 10 and the clamping force to be applied by the bolts 12. An annular sealing gasket 18 typically of a soft metallic material such as OFHC copper is retained by the sealing grooves 16. In a preferred embodiment, but not restricted thereto, the gasket 18 has a rectangular cross section (discussed later) and is continuous in length.

One of the important parameters to be considered in the design of gasket flange seals is the compressive loading of the sealing edges. As clearly seen in FIGS. 2, 3 and 4, contact between the flange 10 and gasket 18 occurs along the edges of the gasket, rather than on its faces or flat surfaces, and therefore the gasket, at the sealing edge, is subject to a compressive load L which is comprised of a component $L_B$ due to the bolt loading and a component $L_F$ due to the radial tension in the flange.

Since the only contact between the flange and the gasket is along the sealing edges, any scratches along this edge is a potential source of a leak. However, as best seen in FIG. 4, because the gasket is subjected, at the sealing edges, to the compressive load L and is constructed of a deformable soft metal, the potential of leak sources is minimized because of the pure compression effect of the load L on the sealing edge resulting in a closing or filling of any scratches or deformations in this edge.

For maximum compressive loading and plastic flow of the sealing edges, the angle of inclination of the surface of the sealing grooves should be approximately 45°. This value was determined by experimentally loading flange members having sealing grooves of varying inclined surfaces and noting the resulting deformation in a cross hatched pattern lightly scribed on the surfaces of the blocks. Through these tests it was found that the patterns on the blocks indicated pure compression of the sealing edge results with a sealing groove having surfaces inclined between the range of 40° to 50°.

To utilize sealing grooves with symmetrically inclined surfaces necessitates that for effective sealing the sealing grooves be uniform in size and be coaxial about a transverse central axis. However, the present sealing device overcomes this critical alignment problem by making the sealing groove 16 substantially semicircular in shape and by utilizing a sealing gasket 18 having a width dimension $d_2$ which is less than the dimension of the diameter of the groove $d_1$ such as .707 of that dimension. Through this specific dimensioning of the sealing gasket 18 the sealing groove 16 will contact the sealing edges at an angle of inclination of 45°, which is within the optimum range of angles for compression and plastic flow as noted above. In this fashion, as shown in FIG. 3, one of the sealing elements 10 may be misaligned relative to the central axis of the other element and an efficient seal provided since the gasket 18 rotates so that the sealing groove still contact the sealing edge at an angle of inclination of 45°.

It has been found desirable, but not limiting, to make the height of the sealing gasket 18 the same as the diameter $d_1$ of the circular sealing groove 16 since this assures that the right compressive force will be applied to the sealing gaskets 16 without bringing the opposing surfaces of the flanges into contact.

While one embodiment of this invention has been herein illustrated, it will be appreciated by those skilled in the art that variations of the disclosed arrangement both as to its details, the dimensioning of the sealing groove and sealing gaskets, and as to the organization of such details may be made without departing from the spirit and scope thereof. Accordingly, it is intended that the foregoing disclosure and the showings made in the drawings shall be considered as illustrative of the principle of this invention and not construed in a limited sense.

What is claimed is:

1. A flange seal having a mis-alignment compensating means comprising:
   a first flange member having a first annular semicircular groove at a first distance from a center line and a plurality of bores at a second distance from said center line greater than said first distance;
   a second flange member having a second annular semicircular groove at a third distance from said center line and a plurality of bores each spaced to be aligned with a different one of the bores in said first flange member;
   a plurality of bolts extending through said bores to draw said first and second flange members together and to retain said grooves in substantially confronting relationship; and
   an annular, rectangular, metal gasket positioned in said first and second grooves having a major axis substantially parallel with said center line and two edges in contact with said first groove, and two different edges in contact with said second groove, said gasket having its radially inner and outer wall surfaces substantially parallel to the center line substantially parallel with said center line as said bolts are tightened when said first and third distances are equal and to twist within said first and second grooves when said first and third distances are not equal to cause said wall surfaces to assume an acute angle with respect to the center line and to continuously retain the edges thereof in the contact with said grooves resulting in an uninterrupted seal, by each of the four corners of said gasket.

2. The flange seal of claim 1 wherein the gasket has a width less than the diameter of the first and second grooves and height equal to or greater than said diameter.

References Cited by the Examiner

UNITED STATES PATENTS

| | | | |
|---|---|---|---|
| 783,944 | 2/1905 | Frost | 285—336 |
| 2,291,709 | 8/1942 | Goetze | 285—336 |
| 2,898,000 | 8/1959 | Hanny | 285—336 X |
| 3,010,172 | 11/1961 | Kaplan | 285—367 X |

OTHER REFERENCES

National Engineer, March 1929, pages 112, 113, 114.

CARL W. TOMLIN, *Primary Examiner.*